United States Patent
Benedict

Patent Number: 5,634,491
Date of Patent: Jun. 3, 1997

[54] FLOW CONTROL VALVE ASSEMBLY

[76] Inventor: Charles Benedict, 3114 Lakeshore, Tallahassee, Fla. 32312

[21] Appl. No.: 546,716

[22] Filed: Oct. 23, 1995

[51] Int. Cl.⁶ ............................... E03C 1/08; G05D 7/01
[52] U.S. Cl. .................. 137/504; 138/45; 239/533.13; 251/5
[58] Field of Search .................. 137/504; 138/45; 239/533.13; 251/5

[56] References Cited

U.S. PATENT DOCUMENTS

| | | |
|---|---|---|
| 1,657,663 | 1/1928 | Devereux . |
| 2,261,531 | 11/1941 | Thomas . |
| 2,914,084 | 11/1959 | McLean et al. ............... 137/504 |
| 2,941,544 | 6/1960 | Peras . |
| 2,988,346 | 6/1961 | Sciore . |
| 3,308,798 | 3/1967 | Snider ............... 137/504 X |
| 3,503,417 | 3/1970 | Toda et al. . |
| 3,958,596 | 5/1976 | Garrard . |
| 3,970,105 | 7/1976 | Pelton et al. . |
| 3,999,714 | 12/1976 | Lang . |
| 4,075,294 | 2/1978 | Saito et al. . |
| 4,244,526 | 1/1981 | Arth . |
| 4,609,014 | 9/1986 | Jurjevic et al. . |
| 4,867,198 | 9/1989 | Faust . |
| 5,004,008 | 4/1991 | Drucker . |
| 5,251,655 | 10/1993 | Low . |
| 5,338,313 | 8/1994 | Mollenauer et al. . |
| 5,497,946 | 3/1996 | Laidler ............... 239/533.13 X |

FOREIGN PATENT DOCUMENTS

| | | |
|---|---|---|
| 2616566 | 10/1977 | Germany . |
| 1237678 | 12/1969 | United Kingdom . |

*Primary Examiner*—Gerald A. Michalsky
*Attorney, Agent, or Firm*—Dowell & Dowell

[57] ABSTRACT

A flow control valve assembly having an outer housing and a valve member mounted within the housing. The valve member defines a flow channel and is composed of a compressible material which remains substantially in a non-compressed condition at fluid supply pressures below a predetermined range. At higher pressures, the valve member is compressed to reduce the flow channel so as to automatically control the flow rate through the valve assembly.

16 Claims, 2 Drawing Sheets

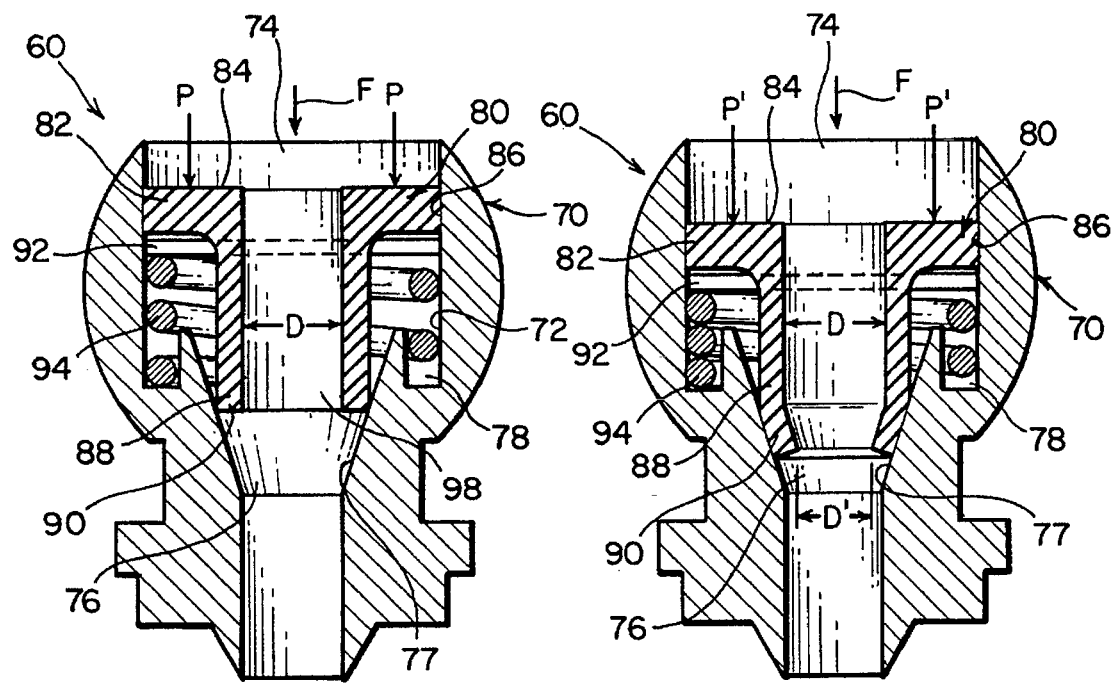
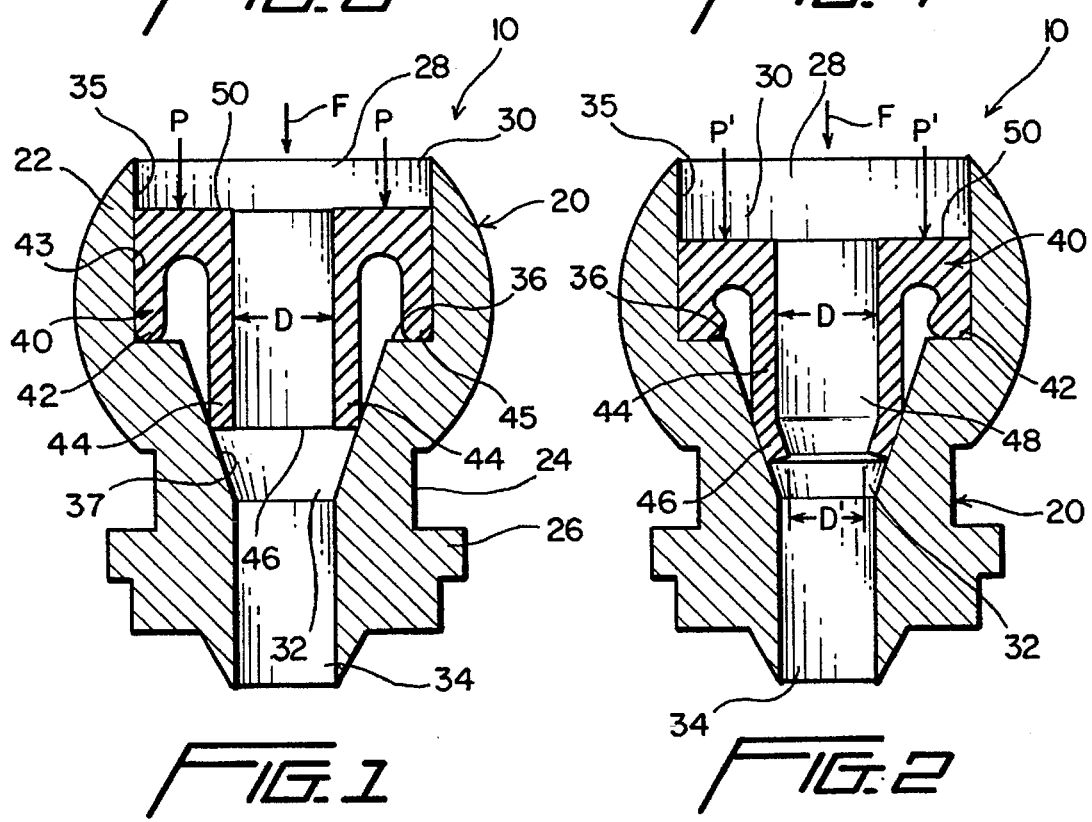

5,634,491

FLOW CONTROL VALVE ASSEMBLY

BACKGROUND OF THE INVENTION

The invention relates to the area of valves, and, more particularly, to a flow-responsive valve assembly for automatically maintaining a rate of flow approximately within predetermined limits under variable fluid supply line pressures.

During normal operation of showers and other water supply systems, supply line pressure varies periodically. Such variations affect the spray or discharge pattern of the systems which are generally designed to operate most effectively at a predetermined supply line pressure. Significant supply line pressure variations cause surges in the flow rate, resulting in excessive water consumption and inconsistent spray patterns.

Surges in the flow rate can be dangerous, for example, when extremely hot water is being supplied by a shower. In such instances, individuals are subject to being scalded. Controlling water consumption is an especially important concern in situations where water conservation is required because of limited fresh water supplies, such as on ships and in arid regions subject to mandatory water rationing regulations.

Thus, in view of the above-described considerations, there has been a need for a flow control valve assembly which is capable of maintaining a substantially constant fluid flow rate for variable supply line pressures falling within a predetermined range.

SUMMARY OF THE INVENTION

The present invention has been made in view of the above-described problems and the inadequacies of the related art and has as an object to provide a flow control valve assembly which provides a controlled and substantially constant volumetric flow rate for supply line pressures falling within a predetermined range.

Another object of the present invention is to provide a flow control valve assembly which maintains a substantially constant flow rate and prevents flow surges over a broad range of supply line pressures.

Yet another object of the present invention is to provide a flow control valve assembly which maintains a substantially constant flow rate for a normal operating range of supply line pressures and reduces water consumption.

Additional objects and advantages of the present invention will become apparent from the detailed description which follows. The flow control valve assembly in a preferred embodiment of the invention comprises a housing having a valve seat which communicates with a flow passageway therethrough. The valve seat includes an inwardly converging portion. A valve member composed of a compressible material is mounted in the fluid passageway. The valve member is resiliently mounted within the housing and includes a head portion having an upstream face and a side flange. The valve member also includes a hollow stem portion movable with respect to the inwardly converging portion of the valve seat. The hollow stem portion defines a flow channel in communication with the flow passageway. The flow channel has an inlet end and an outlet end.

As fluid flows through the valve assembly, the valve member remains in a first position wherein the control valve assembly is open allowing maximum flow therethrough. The valve member is yieldably supported in the first position by making the flange of the head portion flexible or by supporting the head portion with a spring or other resistant member. The valve member remains in the first position so long as the fluid pressure acting on the upstream face of the head portion is less than a predetermined pressure. At greater pressures, the valve member is moved inwardly of the valve seat and the stem portion of the valve member is progressively radially compressed by the converging portion thereof such that the diameter or cross-sectional area of the flow channel is reduced. This restriction of the flow channel maintains the volumetric flow rate through the valve assembly within a predetermined range for supply line pressures greater than the predetermined pressure and falling within a predetermined range.

In another embodiment of the present invention, the valve seat defined by the housing includes a generally non-converging flow passageway having one or more extending projections or protuberances which extend inwardly of the flow passageway for engaging the valve stem as it moves under the influence of greater pressure being applied to the head portion of the valve member. Such projections or protuberances effectively close or reduce the cross-sectional area of the flow channel defined by the valve stem.

In a further alternative embodiment, the flow channel through the valve member may include one or more side openings in the valve stem portion which communicate with openings in the periphery of the head portion with the openings in the valve stem being upstream of the projections, protuberances, or converging wall portions defined by the housing.

BRIEF DESCRIPTION OF THE DRAWINGS

In the accompanying drawings:

FIG. 1 is a cross-sectional view of a valve assembly in accordance with a preferred embodiment of the invention in which the stem portion of the valve member is in a substantially non-compressed condition;

FIG. 2 is a cross-sectional view of the valve assembly of FIG. 1 in which the stem portion of the valve member is in a compressed condition;

FIG. 3 is a cross-sectional view of a valve assembly in accordance with another preferred embodiment of the invention in which the stem portion of the valve member is in a substantially non-compressed condition;

FIG. 4 is a cross-sectional view of the valve assembly of FIG. 3 in which the stem portion of the valve member is in a compressed condition;

DETAILED DESCRIPTION OF THE PREFERRED EMBODIMENTS

Figures 5, 6:
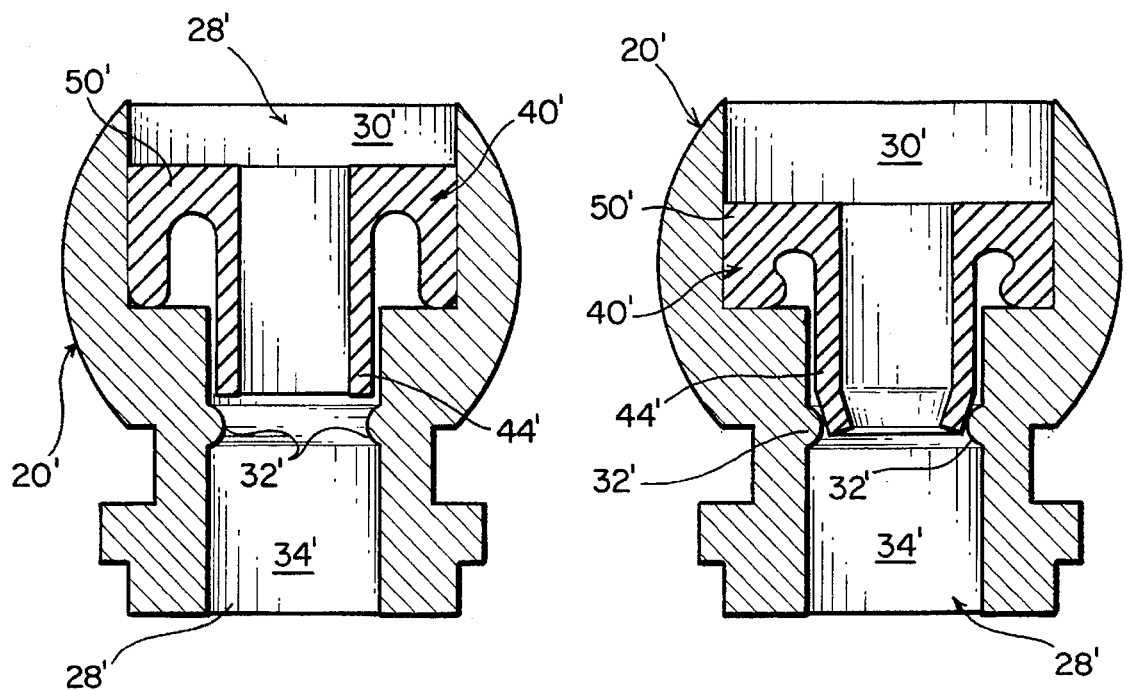
FIG. 5 is a cross-sectional view of an alternate embodiment wherein the valve member is in a first or open position.
FIG. 6 is a cross-sectional view of the control valve assembly of FIG. 5 showing the valve member shifted so as to restrict flow through the valve stem.

The preferred embodiments of the invention will now be described in detail with reference to the drawing figures in which common reference numbers identify common elements.

FIGS. 1-2 illustrate a valve assembly 10 in accordance with a preferred embodiment of the invention. The valve assembly is comprised of an outer housing 20 and a valve member 40 mounted in the housing.

The illustrated housing 20 is a ball adapter including a bulbous upper portion 22, an intermediate neck portion 24 and a base portion 26. The ball adapter is of an outer configuration conventionally used in showerhead assemblies. The valve member 40 may optionally be provided in other housing configurations depending on the environment of the valve assembly. For example, the valve assembly may be used in other fluid supply systems such as water fountains, sprinkler systems and the like, in which it is desired to automatically control the flow rate during operation. The valve assembly may also be used in gas supply systems.

As shown, the housing 20 defines an axial flow passageway 28 including a cylindrical upper portion 30, an intermediate, inwardly converging valve seat portion 32, and a cylindrical, hollow lower portion 34. The upper portion 30 is of a greater diameter than the lower portion 34.

The valve member 40 preferably has a unitary construction and includes a head portion 50 from which a peripheral outer wall or flange 42 extends in surrounding concentric relationship to a tubular stem 44 extending parallel to and below the outer flange. The outer flange has an outer face 43 which may contact the peripheral wall 35 defining the upper portion 30 of the passageway 28, and a lower end 45 which is supported by a horizontal internal shoulder 36 of the housing. The stem 44 includes a lower end 46 which is seated in the inwardly converging valve seat portion 32. The valve member 40 is formed of a compressible, resilient material.

FIG. 1 illustrates the valve member 40 in a substantially non-compressed condition in which a fluid flow, F, exerts a pressure, P, on the upstream face of the head portion 50. This pressure maintains the valve member seated in the housing 20. In the non-compressed condition, the valve stem 44 defines a flow channel having a substantially uniform diameter, D, along its length.

FIG. 2 illustrates the valve member 40 in a compressed or restricted condition in which the fluid, F, is exerting an increased pressure, P', on the upstream face of the head portion of the valve member. The increased fluid pressure axially compresses the outer flange 42 and causes the valve stem 44 to move axially in the inwardly converging valve seat portion 32, resulting in the lower end 46 of the stem 44 being radially compressed to a reduced diameter, D'. As shown, the diameter, D, at the inlet end of the flow channel is greater than D'. At greater supply line pressures than P', the flange 42 is further axially compressed and the lower end 46 of the valve stem 44 is further radially compressed by contact with the inwardly converging valve seat 32, causing the diameter at the lower end of the stem to be reduced to a smaller diameter than D' (not shown). The flange portion of the valve member 40 is resilient so that it urges the valve member to return to the non-compressed condition illustrated in FIG. 1 when the supply line pressure is reduced from P' to P.

The controlled compression of the valve member 40 due to changes in the supply line pressure maintains the volumetric flow rate through the valve assembly 10 within approximately a predetermined range for supply line pressures also falling approximately within a predetermined range. This prevents flow surges through the valve assembly due to periodic variations in the supply line pressure and maintains a substantially constant flow rate which prevents the excessive consumption of water and other liquids, as well as gases. The valve assembly is also capable of providing a substantially uniform flow rate when installed in different supply systems, each having a significantly different supply line pressure which falls within the predetermined range.

These and other advantages of the valve assembly in accordance with the invention are achieved by forming the valve member of a material having a suitable compressibility so that for supply line pressures within the predetermined range, the restricted diameter and corresponding cross-sectional flow area at the lower end 46 of the valve stem 44, are within predetermined values. As a result, the volumetric flow rate through the valve assembly is controlled to within a predetermined range. Once the supply line pressure drops to below the predetermined pressure range, the valve member returns to the uncompressed condition as depicted in FIG. 1, in which the flow channel of the valve stem has a substantially uniform diameter along its length.

For example, for a supply line pressure range of about 20–80 psi for a liquid, the compressibility of the valve member 40 and the non-compressed diameter, D, of the valve stem, can be selected to provide a volumetric flow rate through the valve assembly within the range of about 2.0–2.5 GPM. Such a flow rate range is suitable in shower systems. The valve member can be selected to provide a preferred flow rate for a supply line pressure range normally encountered in the environment of the valve assembly.

In this type of application, it is preferred that the cross-sectional area of the valve stem to the tapering portion of the valve seat be such that the valve stem will not close even under maximum pressure conditions so that at least some fluid flow is permitted regardless of the pressure being applied to the head portion of the valve member.

The valve member is preferably formed of a rubber material which may be a silicone impregnated rubber. Such materials provide suitable compressibility over a range of normal operating temperatures and also substantially maintains their properties over a prolonged period of usage. Accordingly, the valve stem is properly restricted for a supply line pressure range over a range of operating temperatures, thus ensuring a substantially consistent flow rate at different water temperatures.

A valve assembly 60 in accordance with another embodiment of the invention is illustrated in FIGS. 3 and 4. The valve assembly 60 is comprised of a housing 70 of the same outer configuration as in the valve assembly 10 and a valve member 80 mounted in the housing. The valve assembly 60 also may optionally comprise other types of housings depending on the intended application.

The valve member 80 is comprised of disc-shaped head portion 82 having an upstream face 84 and a side wall 86 which may contact a peripheral wall 72 of an upper portion 74 of a flow passageway 75 through the housing 70. A tubular valve stem portion 88 extends from the head portion and includes a lower end 90 seated in an inwardly converging valve seat portion 76 of the passageway 75. The valve member 80 is preferably composed of the same material as the valve member 40.

A disc 92 formed of a rigid material, such as a corrosion resistant metal or a plastic, is fitted on the valve stem 88 adjacent to the disc-shaped head portion 82. A spring 94 is positioned below the disc 92 and is seated in a circular groove 78. The spring is provided to resiliently urge the disc 92 and valve member 80 upwards against the fluid pressure, P, acting on the upstream face of the valve member.

The spring has effective resiliency so that it remains substantially non-compressed at supply line pressures below a predetermined pressure. The spring is deflected at supply line pressures above the predetermined pressure, allowing the valve member 80 to move axially in the direction of flow relative to the housing. During this movement, the diameter of the lower end 90 of the valve stem 98 is reduced from the uncompressed diameter, D, depicted in FIG. 3, to a compressed diameter, D', depicted in FIG. 4. Restriction of the lower end of the flow opening maintains the volumetric flow rate through the valve assembly within a predetermined range.

In the embodiments shown in FIGS. 1 through 4, the channel defined by the valve stems is preferably circular in cross-section and the fluid passageway and converging valve seat portions of the fluid passageways are also generally circular in cross-section. However, the valve assemblies in accordance with the teachings of the present invention, may have other cross-sectional configurations. For instance, the valve stem portions may be rectangular in cross-sectional configuration and correspond and cooperate with rectangular cross-sectional valve seats formed in the housings. Other cross-sectional configurations may be utilized as well. In other embodiments, the configuration of the valve seat may be shaped to deform or twist the valve stem much in the manner of a restricting iris diaphragm.

A further variation of the teachings of the present invention is shown in FIGS. 5 and 6. In this embodiment, the valve member is configured in the same manner as the embodiment of FIGS. 1 and 2. It should be noted that the valve member may take the configuration of the embodiment shown in FIGS. 3 and 4 as well.

The valve assembly includes an outer housing 20' and a valve member 40' mounted within the housing. The housing 20' defines an axial flow passageway 28' including an enlarged cylindrical upper portion 30' and a generally cylindrical hollow lower portion 34'. In this embodiment, the valve seat is not defined by an inwardly converging wall portion, as is shown in FIGS. 1 through 4, but is rather formed of at least one or a plurality of inwardly extending extensions or protrusions 32' which extend into the lower cylindrical passageway 34'. In the embodiment shown, the protrusions are formed as generally rounded members which are molded with the housing 20 and serve to restrict the lower portion of the passageway 34'. As opposed to utilizing separate protrusions, a singular annular flange may be provided which extends inwardly to constrict the fluid passageway.

The inwardly extending protrusions 32' cooperate to reduce the flow channel defined by a valve stem portion 44' of valve member 40' as increased pressure is applied to the upstream face of a head portion 50' associated with the valve member, in a manner as previously discussed with the embodiments of FIGS. 1 through 4. Also, as with the embodiments previously discussed, the cross-sectional configuration of the flow passageway through the housing and of the valve stem portion of the valve member may be other than circular so long as the valve stem is compressed radially as the valve member 40' is urged axially with respect to the flow passageway through the housing.

Figure 7:
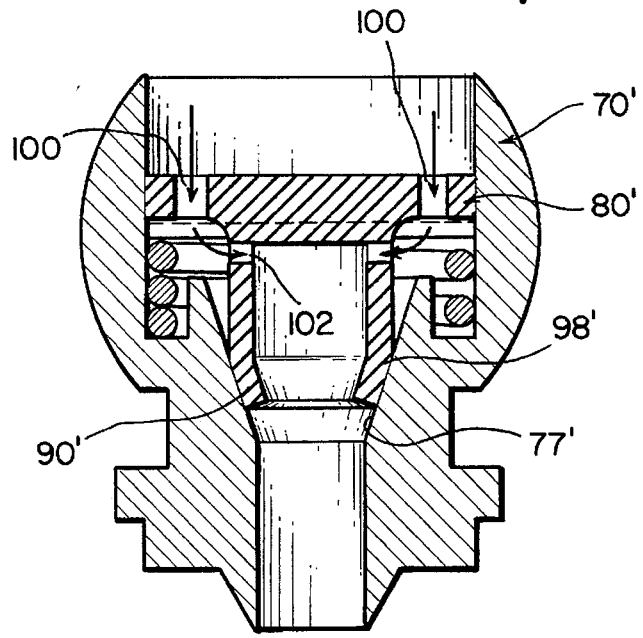
FIG. 7 is a cross-sectional view of a control valve assembly similar to that of FIG. 4 showing an alternate embodiment of valve member.

It should also be noted that the flow channel through the valve member need not be axial with respect to the length of the valve member. For instance, openings may be provided through the head portion offset from the axis of the valve member which communicate with additional openings in the side walls of the valve stem portion of the valve member to allow fluid communication into the flow channel at a point above the valve stem portion defining the restricted passageway through the housing. Such a valve member would function in the same manner as discussed with respect to the embodiments shown to restrict fluid flow dependent upon the upstream pressure applied to the valve member within the housing. Such an embodiment is shown in FIG. 7. The embodiment of FIG. 7 conforms to the general valve assembly configuration as shown in FIG. 4 with the valve member 80' shown being restricted by a tapering valve seat 76' associated with the housing 70'. In this embodiment, fluid flow toward the front face of the head portion 82' enters the valve stem 98' by way of a plurality of first openings 100 extending through the head portion 82' which communicate with a plurality of radially arranged openings 102 formed in the valve stem. The openings 102 are provided above the converging valve seat portions of the housing so that fluid passing therethrough is subject to the restricted opening created as the valve stem is urged into progressively increased contact with the converging walls of the valve seat.

The foregoing description of the preferred embodiments of the invention have been presented to illustrate the principles of the invention and not to limit the invention to the particular embodiment illustrated. It is intended that the scope of the invention be defined by all of the embodiments encompassed within the following claims and their equivalents.

What is claimed is:

1. A valve assembly for maintaining generally uniform flow rates comprising:

a housing having an inner surface defining a flow passageway, said flow passageway including at least one inwardly extending valve seat portion, a valve member mounted in said fluid passageway, said valve member including a head portion having an upstream face and a stem portion having a flow channel therethrough having an inlet end and an outlet end, said valve member normally being seated in a first position within said housing when fluid flow therethrough is below a predetermined pressure with said flow passageway of said housing and said flow channel being open and said outlet end of said stem portion having a first cross-sectional dimension, said stem portion of said valve member being axially shiftable relative to said valve seat portion when fluid flow through the valve member creates a pressure acting on said upstream face which is greater than said predetermined pressure to thereby compress said valve stem portion by engagement with said at least one inwardly extending valve seat portion whereby said first cross-sectional dimension of said flow channel is reduced at a point spaced from said inlet end thereof to thereby regulate fluid flow through said valve member, and means spaced outwardly relative to said valve stem for resiliently urging said valve member from said at least one inwardly extending valve seat portion.

2. The valve assembly of claim 1 in which said means for resiliently urging said valve member includes a flange integrally formed with said head portion of said valve member, said flange extending inwardly of said housing in generally concentric relationship with respect to said stem portion of said valve member, said housing including a shoulder engagable by said flange of said valve member, and said flange being formed of resilient material to normally urge said head portion of said valve member from said shoulder to said first position.

3. The valve assembly of claim 2 in which said at least one inwardly extending valve seat portion includes tapered inwardly converging wall portions.

4. The valve assembly of claim 2 in which said at least one inwardly extending valve seat portion includes a plurality of projections extending into said flow passageway of said housing.

5. The valve assembly of claim 1 in which said at least one inwardly extending valve seat portion includes a plurality of projections extending into said flow passageway of said housing.

6. The valve assembly of claim 1 in which said means for resiliently urging said valve member includes a spring means, and said spring means being engagable relative to a lower surface of said head portion of said valve member.

7. The valve assembly of claim 6 in which said at least one inwardly extending valve seat portion includes tapered inwardly converging wall portions.

8. The valve assembly of claim 6 in which said at least one inwardly extending valve seat portion includes a plurality of projections extending into said flow passageway of said housing.

9. A valve assembly for maintaining substantially uniform fluid flow rates regardless of the pressure of the fluid flowing therethrough comprising:

a housing having an inner surface defining a flow passageway, said flow passageway including an inwardly constricting valve seat portion; and a valve member composed of a compressible material being mounted in said flow passageway, said valve member including an upstream face, and a tubular stem portion seated in said inwardly constricting valve seat portion of said fluid passageway, said tubular portion defining a flow channel in communication with said flow passageway, said flow channel having an inlet end and an outlet end, said inlet end of said flow channel defining a first cross-sectioned area, said valve member normally being seated in a first position within said housing when fluid flow therethrough is below a predetermined pressure with said flow passageway of said housing and said flow passageway of said housing and said flow channel being open, said stem portion of said valve member being substantially non-compressed when fluid pressure acting on said upstream face is less than a predetermined pressure and said valve member being in said first position, and said stem portion being compressed when said fluid pressure is greater than said predetermined pressure, such that said tubular stem portion moves axially in said inwardly constricting valve seat portion and the flow channel is radially reduced to less than said first cross-sectional area of said inlet end of said flow channel.

10. The valve assembly of claim 9, wherein said valve member is formed of a rubber material.

11. The valve assembly of claim 10, wherein said valve member includes an outer flange disposed in a surrounding concentric relationship relative to said tubular stem portion, said housing including a shoulder portion supporting said outer flange, and said outer flange being axially compressed against said shoulder portion when said fluid pressure is greater than said predetermined pressure.

12. The valve assembly of claim 10, further comprising a spring means positioned about said tubular stem portion and a rigid disc positioned about said tubular portion above said spring, said spring exerting a force on said rigid disc and said valve member opposing said fluid pressure acting on said upstream face.

13. The valve assembly of claim 12, wherein said spring means is substantially non-deflected when said fluid pressure acting on said upstream face of said valve member is less than said predetermined pressure.

14. The valve assembly of claim 12, wherein said spring means is deflected when the fluid pressure acting on said upstream face of said valve member is within a predetermined pressure range, and said stem portion of said valve member is compressed such that said flow channel is reduced so as to maintain a flow rate through said valve member within approximately a predetermined range.

15. The valve assembly of claim 14, wherein the predetermined pressure range is from about 20–80 psi and the predetermined flow rate range is from about 2.0–2.5 GPM.

16. A valve assembly for maintaining a substantially uniform fluid flow rate regardless of the pressure of the fluid flowing therethrough comprising:

a housing having an inner surface defining a flow passageway, said flow passageway including an inwardly converging valve seat portion; and a valve member being mounted in said fluid passageway, said valve member including an upstream face, a side face contacting said inner surface of said housing and a hollow stem portion seated in said inwardly converging portion of said fluid passageway, said stem portion defining a flow channel in communication with said flow passageway through which all fluid must flow through said housing, said flow channel having an inlet end and an outlet end, said stem portion being formed of a compressible material, said valve member normally being seated in a first position within said housing when fluid flow therethrough is below a predetermined pressure with said flow passageway of said housing and said flow passageway of said housing and said flow channel being open, and said stem portion of said valve member being compressed when fluid pressure on said face portion is greater than said predetermined pressure such that said stem portion moves axially in said inwardly converging valve seat portion, and means for resiliently urging said stem portion from said valve seat portion.

\* \* \* \* \*